United States Patent
Gourdin

(10) Patent No.: US 9,103,129 B2
(45) Date of Patent: Aug. 11, 2015

(54) PROCESS FOR THE PRODUCTION OF A SURFACE COVERING HAVING A BARRIER LAYER

(75) Inventor: Diego Gourdin, Wiltz (LU)

(73) Assignee: Tarkett GDL, Lentzweiler (LU)

( * ) Notice: Subject to any disclaimer, the term of this patent is extended or adjusted under 35 U.S.C. 154(b) by 51 days.

(21) Appl. No.: 13/878,713

(22) PCT Filed: Sep. 23, 2011

(86) PCT No.: PCT/EP2011/066555
§ 371 (c)(1),
(2), (4) Date: Sep. 17, 2013

(87) PCT Pub. No.: WO2012/049003
PCT Pub. Date: Apr. 19, 2012

(65) Prior Publication Data
US 2014/0011037 A1  Jan. 9, 2014

(30) Foreign Application Priority Data

Oct. 12, 2010 (EP) .................. PCT/EP10/65276

(51) Int. Cl.
*B05D 7/02* (2006.01)
*E04F 15/16* (2006.01)
*B05D 3/02* (2006.01)
*B29C 71/02* (2006.01)
*C08J 7/04* (2006.01)

(52) U.S. Cl.
CPC ............... *E04F 15/163* (2013.01); *B05D 3/02* (2013.01); *B05D 7/02* (2013.01); *C08J 7/047* (2013.01); *C08J 7/08* (2013.01); *C08J 2327/06* (2013.01); *C08J 2429/04* (2013.01); *Y10T 428/31663* (2015.04)

(58) Field of Classification Search
None
See application file for complete search history.

(56) References Cited

U.S. PATENT DOCUMENTS

| 5,942,320 | A  | * | 8/1999 | Miyake et al. ............. 428/216 |
| 6,337,370 | B1 |   | 1/2002 | Bae et al. |
| 8,586,146 | B2 | * | 11/2013 | Siche et al. ............. 427/412.1 |
| 2012/0114931 | A1 | | 5/2012 | Siche |

FOREIGN PATENT DOCUMENTS

| CA | 2349052 A1 | 2/2002 |
| GB | 2053027 A | 2/1981 |
| JP | 2001081216 A | 3/2001 |
| WO | WO 2010/142325 A1 | 12/2010 |
| WO | WO 2010/142326 A1 | 12/2010 |

* cited by examiner

*Primary Examiner* — Erma Cameron
(74) *Attorney, Agent, or Firm* — Reinhart Boerner Van Deuren P.C.

(57) ABSTRACT

The present invention relates to a process for the production of a surface covering comprising the steps of providing a PVC-based wear layer (1) substantially free of inorganic fillers, applying on said PVC-based layer (1) a top coating composition comprising polyvinyl alcohol (PVA) and a silane compound comprising at least one amine function, heating said PVC-based layer (1) and said top coating composition at a temperature equal or superior to 150° C. to form a wear layer top coating (2).

14 Claims, 1 Drawing Sheet

PROCESS FOR THE PRODUCTION OF A SURFACE COVERING HAVING A BARRIER LAYER

CROSS-REFERENCE TO RELATED APPLICATIONS

This patent application claims priority to PCT/EP2011/066555, filed Sep. 23, 2011, which claims the benefit of International Application No. PCT/EP2010/065276, filed Oct. 12, 2010.

FIELD OF THE INVENTION

The present invention relates to a process for the production of a PVC-based surface covering comprising a PVC-based wear layer and a polyvinyl alcohol-based layer.

PRIOR ART AND RELATED TECHNICAL BACKGROUND

PVC-based surface coverings are widely used to decorate buildings, houses or vehicles. However, PVC-based surface coverings have the drawback of releasing volatile organic compounds (VOCs), which for some of them are toxics.

To reduce or prevent the VOC release it was suggested to replace the volatile components by non-volatile components; However this lead to an important decrease of stiffness of the surface covering while stiffness is an important requirement of resilient surface coverings, especially floor coverings.

It was also suggested to use a polyester, or polyamide layer, as barrier layer or as an intermediate layer in a multiple layers surface coverings. A polyvinyl alcohol (PVA) layer was not commonly used as PVA has a poor adherence to PVC-based layers.

To improve the adherence of PVA to a PVC-based layer comprising inorganic fillers, PCT/EP2009/057107 discloses the use of a barrier layer composition comprising PVA and a silane compound comprising at least one amine function.

However, this solution is not suitable to obtain sufficient adherence of PVA on a PVC-based wear layer comprising no inorganic fillers or very low concentration of inorganic fillers.

Therefore, generally an adhesion primer should be applied on the PVC-based wear layer comprising no fillers, which implies additional process steps and leads to an increase of production costs and technical difficulties.

AIMS OF THE INVENTION

The present invention aims to provide a process for the production of a surface covering which does not have the drawbacks of the prior art.

The invention aims to provide a process for the production a surface covering comprising a wear layer top coating having an improved adherence to a PVC-based wear layer comprising substantially no fillers.

The invention aims to provide a process for the production of a surface covering combining physical resistance properties and chemical and gas barrier properties.

SUMMARY OF THE INVENTION

The present invention relates to a process for the production of a surface covering comprising the steps of providing a PVC-based wear layer substantially free of inorganic fillers, applying on said PVC-based layer a top coating composition comprising polyvinyl alcohol (PVA) and a silane compound comprising at least one amine function, and heating said PVC-based layer and said top coating composition at a temperature equal or superior to 150° C. to form a wear layer top coating.

According to particular embodiments, the process may comprise one, or a combination, of any of the following characteristics:

the silane compound has the following structure:

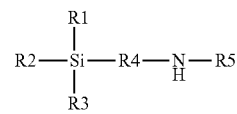

wherein $R_1$, $R_2$, $R_3$ are, independently of one another, an hydroxyl group, a methoxy group, or an ethoxy group, and wherein $R_4$ is $(CH_2)_n$, n being equal to 1, 2 or 3, and wherein $R_5$ is, independently of $R_1$, $R_2$, $R_3$, an Hydrogen, a linear or cyclic alkyl, a phenyl, an amide group, or an amino-ethyl group having the formula $—C_2H_4—NH—R_7$, wherein $R_7$ is hydrogen, an alkyl, a phenyl, a benzyl group or a vinyl-benzyl group.

the silane compound is selected from the group consisting of 3-aminopropyl-triethoxysilane, 3-aminopropyl-trimethoxysilane, aminoethyl-aminopropyl-silane triol, aminoethyl-aminopropyl-trimethoxysilane, N-(2-Aminoethyl)-3-aminopropyl-trimethoxysilane, N-(2-Aminoethyl)-3-aminopropyl-methyldimethoxysilane, N-2-(Benzylamino)-ethyl-3-aminopropyl-trimethoxysilane, N-2-(Vinylbenzylamino)-ethyl-3-aminopropyl-trimethoxysilane, N-Cyclohexyl-aminomethyl-methyldiethoxysilane, N-Cyclohexyl-aminomethyl-triethoxysilane, N-Cyclohexyl-3-aminopropyl-trimethoxysilane, N-Phenyl-aminomethyl-trimethoxysilane, 3-Ureidopropyl-trimethoxysilane and Vinylbenzyl-aminoethyl-aminopropyl-trimethoxy silane, the silane compound represents in weight 6 to 40% of the PVA weight, the silane compound represents in weight around 35% of the PVA weight, the PVC-based layer comprising substantially no inorganic fillers is provided on a liquid form and is pre-gelified at a temperature comprises between 80° C. and 170° C. prior the top coating composition is applied, the step of applying the top coating composition is performed with a PVA-based composition in a liquid form, the top coating composition is applied in a liquid form at between 5 and 100 g/m².

the process further comprises the steps of providing a PVC-based support layer, applying on said PVC-based support the PVC-based wear layer before applying the top coating composition, the process further comprises the step of applying a decorative layer on the PVC-based support layer, the PVC-based support layer comprises a glass mat, the PVC-based support layer is a foamable layer.

The present invention relates also to a surface covering obtained by the process according to the invention.

The surface covering according to the invention is a floor covering.

SHORT DESCRIPTION OF THE DRAWING

DETAILED DESCRIPTION OF THE INVENTION

Figure 1:
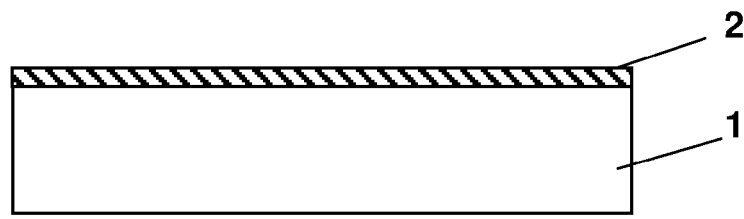
FIG. 1 represents schematically a surface covering according to a first embodiment of the invention.

According to the invention, a barrier composition, or wear layer top coating composition, comprising polyvinyl alcohol (PVA) and a silane compound comprising at least one amine function, is applied on a PVC-based wear layer 1, or film, comprising substantially no fillers, to form a PVA-based top coating 2.

Generally the wear layer of a surface covering is translucent or transparent and therefore comprises no fillers or only a very low concentration of fillers. Therefore, the term "substantially free of inorganic fillers" means that the amount of the inorganic filler(s) contained is below 0.5% by weight of the total weight of the PVC-based wear layer composition.

The wear layer 1 is non-expandable or non-foamable.

In a preferred embodiment, the wear layer 1 comprises 100 phr of PVC, being Lacovyl® PB 1704 H from Arkema, and 40 phr of a di-isononylphthalate plasticizer, being Vestinol® 9 from Evonik.

The wear layer top coating composition is an aqueous composition comprising polyvinyl alcohol and a silane compound.

The silane compound is selected from the group consisting of silanes, functionalised silanols, and silanes or silanols compounds comprising at least one amine function.

Preferably, the silane compound have the following formula:

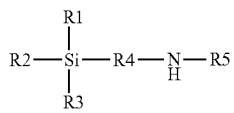

wherein $R_1$, $R_2$, $R_3$ are, independently of one another, an hydroxyl group, a methoxy group, or an ethoxy group, and wherein $R_4$ is $(CH_2)_n$, n being equal to 1, 2 or 3, and wherein $R_5$ is, independently of $R_1$, $R_2$, $R_3$, an Hydrogen, a linear or cyclic alkyl, a phenyl, an amide group, or an amino-ethyl group having the formula —$C_2H_4$—NH—$R_7$, wherein $R_7$ is hydrogen, an alkyl, a phenyl, a benzyl group or a vinyl-benzyl group.

Preferably, the silane compound is selected from the group consisting of 3-aminopropyl-triethoxysilane, 3-aminopropyl-trimethoxysilane, aminoethyl-aminopropyl-silane triol, aminoethyl-aminopropyl-trimethoxysilane, N-(2-Aminoethyl)-3-aminopropyl-trimethoxysilane, N-(2-Aminoethyl)-3-aminopropyl-methyldimethoxysilane, N-2-(Benzylamino)-ethyl-3-aminopropyl-trimethoxysilane, N-2-(Vinylbenzylamino)-ethyl-3-aminopropyl-trimethoxysilane, N-Cyclohexyl-aminomethyl-methyldiethoxysilane, N-Cyclohexyl-aminomethyl-triethoxysilane, N-Cyclohexyl-3-aminopropyl-trimethoxysilane, N-Phenyl-aminomethyl-trimethoxysilane, 3-Ureidopropyl-trimethoxysilane and Vinylbenzyl-aminoethyl-aminopropyl-trimethoxy silane.

The silane compound represents preferably between 6 and 40% in weight of the weight of the PVA, more preferably 35%.

The wear layer top coating composition may further comprises a wetting agent, for example a polyether-siloxane type wetting agent.

The wear layer top coating composition is a blend of between 80 and 95% in weight of water, between 5 and 20% in weight of PVA and optionally between 0.4 and 1.5% in weight of a wetting agent. The blend is heated between 90 and 95° C., preferably at 85° C. The composition is then allowed to stand at 85° C. for 60 minutes. After the mixture has been allowed to return to room temperature, the silane compound which represent between 6 and 40% by weight of PVA is added. Any additive or wetting agent is added at this stage.

Examples of compositions comprising a functionalised silane compound are given in tables 1. The proportion of each component is given in phr, in percentage by weight of PVA.

TABLE 1

| | Compositions. | | | | | | | | |
|---|---|---|---|---|---|---|---|---|---|
| | T | 1 | 2 | 3 | 4 | 5 | 6 | 7 | 8 |
| Water | 809.1 | 809.1 | 809.1 | 809.1 | 809.1 | 809.1 | 809.1 | 809.1 | 809.1 |
| PVA | 100 | 100 | 100 | 100 | 100 | 100 | 100 | 100 | 100 |
| Sil-1 | 0 | 6 | 35 | 0 | 0 | 0 | 0 | 0 | 0 |
| Sil-2 | 0 | 0 | 0 | 6 | 35 | 0 | 0 | 0 | 0 |
| Sil-3 | 0 | 0 | 0 | 0 | 0 | 6 | 35 | 0 | 0 |
| Sil-4 | 0 | 0 | 0 | 0 | 0 | 0 | 0 | 6 | 35 |
| Wetting agent | 9.1 | 9.1 | 9.1 | 9.1 | 9.1 | 9.1 | 9.1 | 9.1 | 9.1 |
| Viscosity at 50 rpm | 384 | 480 | 448 | 288 | 320 | 320 | 288 | 320 | 928 |
| Viscosity at 50 rpm after 3 days | 512 | 544 | 640 | 448 | 544 | 512 | 448 | 512 | — |

In the examples, the PVA is Elvanol® 90-50, Elvanol® 71-30, Elvanol® 70-75 from Dupont, or Exceval HR 3010, Exceval AQ 4104 from Kuraray.

The silane compound sil-1 is the 3-aminopropyl-triethoxysilane, for example the Z-6011 from Dow Corning®.

The silane compound sil-2 is the glycidoxy-propyl-trimethoxysilane, for example 26040 from Dow Corning®, or Geniosil® GF 82 from Wacker, Sil-3 is the methacryloxy-propyl-trimethoxysilane, for example Geniosil® GF 31 from Wacker, and Sil-4 is the vinyl-triethoxysilane, for example Geniosil® GF 56 from Wacker.

The wetting agent is a poly-dimethylsiloxane polyether, for example BYK®-307 from BYK, or Tego® Wet 270 from Evonik.

Referring to FIG. 1, the wear layer top coating composition is applied on a PVC-based wear layer 1. More generally, this composition may be applied on any suitable wear layer of any suitable surface covering to form a top coating.

Figure 2:
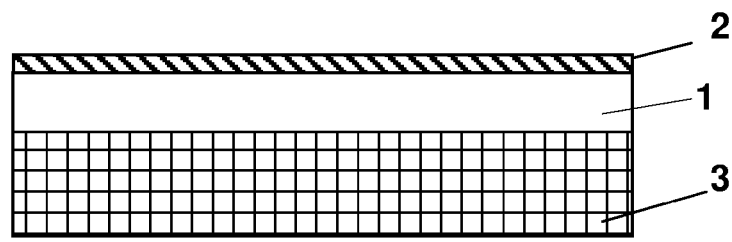
FIG. 2 represents schematically a surface covering according to a second embodiment of the invention.

The surface covering may be a multiple layer and comprise a support layer 3 (FIG. 2), which may be compact or foamable. The top coating composition is then applied over the surface of the wear layer 1 which is opposite to the surface which is intended to contact, and which contacts in the final product, the support layer 3. The support layer 3 may be reinforced by a glass mat 5 (FIG. 4).

In a preferred embodiment a compact, or non-foamable, support layer 1 comprises 100 phr PVC, for example PVC (Lacovyl PB 1702 H), 156 phr of inorganic filler (Omya BL20), 45 phr of DIHP (Jayflex 77), 28 phr of DIBP (Palatinol IC) and 5 phr of a viscosity lowering agent (Exxsol D100), « phr » meaning parts per hundred parts of PVC.

In another preferred embodiment a foamable PVC-based support layer 1 comprise 100 phr PVC, for example Pevikon® P682 and Pevikon® DP 2170, 117 phr of calcium carbonate (Omya BL 20), 2.9 phr of a foaming agent (Porofor ADCL-C2), 1.38 phr of zinc oxide (ZnO), 0.7 phr of Titane RC 82, 30.3 phr of DIHP (Jayflex 77), 26.2 phr of DIBP (Palatinol® IC), and 14.5 phr of a viscosity lowering agent (Exxsol D100), « phr » meaning parts per hundred parts of PVC.

Figure 3:
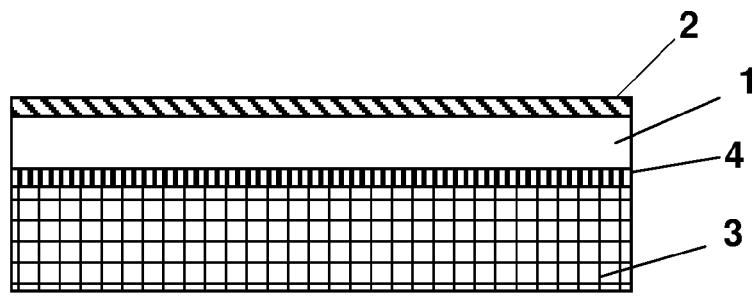
FIG. 3 represents schematically a surface covering according to a third embodiment of the invention.
Figure 4:
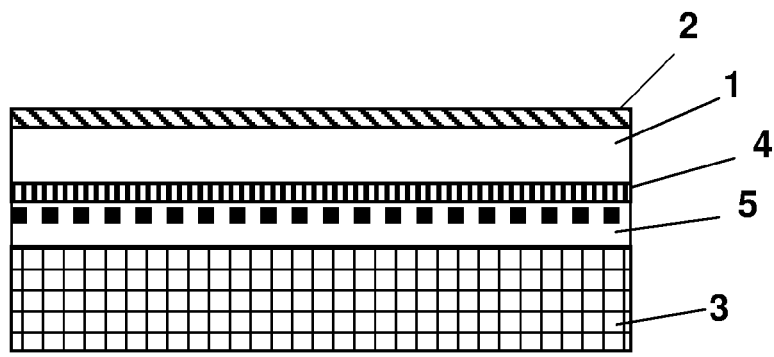
FIG. 4 represents schematically a surface covering according to a forth embodiment of the invention.

The surface covering may further comprise a decorative layer 4 (FIG. 3 and FIG. 4).

Therefore, the process according to the invention may further comprise a step of providing a PVC-based support layer 3 onto which the PVC-based wear layer 1 is applied.

The process may further comprises a step of providing a decorative layer 4 which may be applied between the support layer 3 and the wear layer 1.

The top coating composition may be applied on the wear layer 1 either simultaneously, before or after, the wear layer 1 is applied on the support layer 3.

The top coating composition may be applied once to form a monolayer or in successive layers.

The top coating composition is applied by any suitable method, for example by printing, heliogravure or cylinder coating, wire bar or Meyer bar coating.

Preferably, the top coating composition is applied in a liquid form at between 5 and 100 g/m², preferably around 40 g/m², or around 50 g/m².

Preferably, the top coating composition is applied at a temperature comprised between 80 and 170° C., during 1 to 3 minutes, more preferably at 150° C. during 2 minutes. If the top coating composition is applied at a temperature lower than 150° C., then the top coating composition should be submitted to another heating step at a temperature equal or superior to 150° C. to get an improved adhesion between the top coating composition and the PVC-based wear layer 1.

Preferably the final thickness in the final surface covering of the wear layer top coating or coatings is comprised between 0.5 µm and 10 µm, preferably between 4 µm and 8 µm, more preferably around 4 µm.

Preferably, the PVC-based wear layer 1 is in a liquid form and is pre-gelified by action of heat, using any suitable device, prior the application of the top coating composition. Preferably, the gelling of the wear layer 1 is performed at a temperature comprises between 80° C. and 170° C., more preferably at around 150° C. The gelling is performed during 1 to 3 minutes, preferably during 2.5 minutes.

According to the invention, the PVC-based wear layer 1 and the wear layer top coating 2 are then submitted, during between 2 and 3 minutes, to heat at a temperature equal or superior to 150° C., a temperature which allow to get an improved adhesion between the top coating composition and the PVC-based wear layer 1.

The heating of the PVC-based wear layer 1 and the top coating composition is performed by any suitable device or apparatus, incorporated, or not, to a system for producing a surface covering.

In a preferred embodiment, the PVC-based layer 1 and the top coating composition are submitted to heat at a temperature of around 185° C. during 2.5 minutes.

In the embodiment wherein the support layer 3 is a foamable layer, the heating at a temperature equal or superior to 150° C. present the advantage of further allowing the expansion of the support layer 3, the process needing thus no further steps to obtain a foamed support layer.

To assess the adherence of the wear layer top coating 2 to a PVC-based wear layer 1 comprising substantially no fillers, the top coating composition is applied by wire bar in the form of a continuous monolayer of around 4 µm of thickness.

The adherence is assessed by scratching the wear layer top coating 2 applied onto the PVC-based wear layer 1 and the peel resistance of the wear layer top coating is evaluate with an adhesive tape TESA® 4124. The adherence is considered as satisfying when no parts of the wear layer top coating 2 are removed from the wear layer 1. A mark of "1" is given when the adherence is satisfying and a mark of "3" means that no adherence was obtained. The results are given in table 2.

TABLE 2

Adherence of barrier compositions of table 1 for a PVC-based wear layer without fillers.

| PVC-based wear layer comprising no fillers submitted to a temp of: | T | 1 | 2 | 3 | 4 | 5 | 6 | 7 | 8 |
|---|---|---|---|---|---|---|---|---|---|
| 100° C. | 3 | 3 | 3 | 3 | 3 | 3 | 3 | 3 | 3 |
| 120° C. | 3 | 3 | 3 | 3 | 3 | 3 | 3 | 3 | 3 |
| 140° C. | 3 | 3 | 3 | 3 | 3 | 3 | 3 | 3 | 3 |
| 150° C. | 3 | 2 | 1 | 3 | 3 | 3 | 3 | 3 | 3 |
| 160° C. | 3 | 2 | 1 | 3 | 3 | 3 | 3 | 3 | 3 |
| 170° C. | 3 | 2 | 1 | 3 | 3 | 3 | 3 | 3 | 3 |
| 180° C. | 3 | 2 | 1 | 3 | 3 | 3 | 3 | 3 | 3 |
| 190° C. | 3 | 1 | 1 | 3 | 3 | 3 | 3 | 3 | 3 |
| 200° C. | 3 | 1 | 1 | 3 | 3 | 3 | 3 | 3 | 3 |

The PVC-based wear layer 1 used in the adherence test comprises 70% in weight of PVC and 22% in weight of plasticizer Vestinol® 9 from Evonik.

Compared to the control composition (T) which do not comprises the silane compound and to compositions comprising functionalized silane without at least one amine function (compositions 3 to 8), it appears that the top coating composition according to the invention (composition 1 and 2) present a better adhesion to the PVC-based wear layer 1 comprising substantially no fillers. Furthermore, it appears that the top coating compositions comprising a silane compound with at least one amine and submitted to a temperature equal or superior to 150° C. present a better adherence in comparison to the same compositions being submitted to a temperature of 100 to 140° C. In addition, for lower concentration of amino-silane compound (around 6 phr) in the composition a better adherence is obtained with a temperature equal or superior to 190° C. while for higher concentration of amino-silane compound a better adherence is obtained with a temperature equal or superior to 150° C.

The barrier properties of the wear layer top coating 2, having the composition of sample n° 2 of table 1, was assessed using the bitumen test which consist in laying liquid tar onto a sample being a multilayer PVC-based wear layer 1 having the top coating composition. The sample is then placed in an oven at 70° C. during 7 days to allow migration of the tar components. Backing of the sample is then inspected to check if tar stain is visible. A mark, comprised between « 1 » and « 5 » is given according to the visual aspect of the sample. « 1 » means that no stain is visible at the backing and « 5 » means that tar migrates throughout the sample thickness and is visible at the backing. The results are given in table 3.

TABLE 3

Barrier properties of composition n°2 of table 1.

|  | no barrier layer | T 40 g/m² | 2 7 g/m² | 2 15 g/m² | 2 22 g/m² | 2 40 g/m² | 2 60 g/m² |
|---|---|---|---|---|---|---|---|
| Onto a PVC-based wear layer | 5 | 1 | 4 | 3 | 2 | 1 | 1 |

The barrier properties of the wear layer top coating 2, having the composition of sample n° 2 of table 1, was also assessed by measuring, according ISO 16000-10, the release of the Total Volatile Organic Compounds (TVOC) and the Semi-Volatile Organic Compound (SVOC) of a PVC-based surface covering comprising a top coating over a PVC-based wear layer in comparison to a PVC-based surface covering without top coating (T), with a polyurethane (PU) top coating (samples 1 to 4) and with the top coating 2 according to the invention (samples 5 to 9). The results are given in table 4. The thicknesses of the top coatings are given in weight/m² for the humid form.

TABLE 4

Barrier properties.

| Samples | | TVOC in µg/m³ | SVOC in µg/m³ | Phenol in µg/m³ |
|---|---|---|---|---|
| T | No top coating | 122 | 556 | 4.8 |
| 1 | PU 6 g/m² | 12 | 121 | 0 |
| 2 | PU 12 g/m² | 19 | 174 | 0 |
| 3 | PU 24 g/m² | 10 | 88 | 0 |
| 4 | PU 40 g/m² | 1 | 69 | 0 |
| 5 | PVA 40 g/m² | 2 | 11 | 0 |
| 6 | PVA 50 g/m² | 1 | 10 | 0 |
| 7 | PVA 60 g/m² | 3 | 11 | 0 |
| 8 | PVA 70 g/m² | 0 | 19 | 0 |
| 9 | PVA 80 g/m² | 1 | 11 | 0 |

From table 4, it appears that the top coating according to the invention allows to reduce the release of TVOC, SVOC and phenol in comparison to a PVC-base wear layer without a top coating. In comparison to a PU top coating, the top coating according to the invention allows to reduce significantly the SVOC and TVOC emission, or, for TVOC, to maintain this emission to a level equivalent to the one obtained with a thick layer of polyurethane.

The physical or mechanical resistance properties of the top coating (composition n° 2 of table 1), applied on PVC-based layer comprising 100 phr of PVC (Lacovyl® PB 1704 H from Arkema) and 40 phr of a plasticizer (Vestinol® 9 from Evonik), and dried at 185° C. for 2 minutes and 30 seconds, is assessed in a "Lisson" test and in soiling conditions.

The "Lisson" test reflects the resistance to traffic. A treadwheel is positioned above the top coating and rolled to-and-fro across the sample 2000 times stepwise by 10 cycles of 200 to-and-fro. Before each cycle, a soiling composition according to ISO 11378 and comprising soiling agents and sand is scattered all over the test surface. After each step, the gloss (measured at an incidence angle of 60°) and the lightness (L* value according to CIE L*a*b*, L*=0 meaning black and L*=100 meaning white) are measured and compared to a control sample without the barrier layer to be rated accordingly. The results are given in table 5.

TABLE 5

"Lisson" test results.

| Lisson cycles numbers | PVC-based layer without top coating | | PVC-based layer with PVA-based layer | |
|---|---|---|---|---|
| | L* | Gloss at 60° | L* | Gloss at 60° |
| 0 | 88.8 | 18.43 | 88.64 | 14.37 |
| 200 | 87.59 | 11.97 | 87.00 | 11.83 |
| 400 | 84.39 | 4.57 | 85.07 | 10.30 |
| 600 | 82.22 | 4.07 | 86.41 | 9.97 |
| 800 | 80.70 | 3.50 | 85.35 | 11.43 |
| 1000 | 80.23 | 3.53 | 85.41 | 12.63 |
| 1200 | 80.60 | 3.47 | 84.65 | 11.47 |
| 1400 | 78.31 | 2.97 | 84.52 | 14.87 |
| 1600 | 78.44 | 3.7 | 83.01 | 15.93 |
| 1800 | 78.75 | 3.77 | 83.73 | 16.87 |
| 2000 | 79.72 | 3.5 | 83.28 | 18.37 |

As shown in table 5, it appears that the L* value decreases more rapidly for a PVC-based layer without a top coating in comparison to a PVC-based layer comprising a PVA-based top coating, meaning quicker soiling for the layer without a top coating. Furthermore it appears that the gloss decreases rapidly for the PVC-based layer without coating whereas the PVC-based layer coated with PVA-based composition undergoes less variation, meaning that PVC-based layer without coating is rapidly micro scratched by the soiling powder.

The mechanical resistance of the top coating according to the invention is also assessed under soiling conditions. The test consists in tumbled a surface covering sample (20.5 cm×30 cm) placed on the wall of a revolving metal drum with a bitumen composition and a tetrapod which "walks" along the surface covering samples, mimicking thus a real walking situation. The test is performed during 1000 cycles, each cycle comprising one rotation of the drum. The surface covering sample is then clean with a cloth and dried using a Dry Buffing device. 10 ml of a detergent (0.003% Teepol) is deposited onto the top coating and a rotating weight (around 5 kg) wipes 6 times the top surface of the sample. The surface covering sample is then rise with clear water before being dry with a cloth. The L* value (according to CIE L*a*b*), the YI (Yellowness Index) and the gloss are then measured. The results are given in table 6.

TABLE 6 mechanical resistance results under soiling conditions.

| | PVC-based layer without top coating | | | PVC-based layer with PVA-based layer | | |
|---|---|---|---|---|---|---|
| cycles | L* | YI | Gloss | L* | YI | Gloss |
| 0 | 89.18 | 19.15 | 17 | 88.84 | 19.34 | 13 |
| 200 | — | — | — | 87.86 | 19.46 | 13 |
| 1000 | 79.75 | 32.14 | 19 | — | — | — |

As shown in table 6, it appears that the decrease of the L* value is higher for the PVC-based layer without a top coating compared to the PVC-based layer coated with PVA-based top coating, whereas we observe increase in YI, meaning also quicker soiling.

The surface covering obtained by the process according to the invention comprises a PVA-based top coating, or top layer, over the wear layer 1. The surface covering present the advantage of having a top coating 2 having a good adhesion to the wear layer 1 and having thus barrier properties. The surface covering of the invention present also mechanical or stain resistance properties.

The surface covering obtained by the process according to the invention may be a floor or wall covering or a vehicle covering.

LEGEND

1: PVC-based wear layer comprising substantially no inorganic fillers
2: PVA-based layer
3: PVC-based support layer
4: decorative layer
5: glass mat

The invention claimed is:

1. A process for the production of a PVC-based surface covering comprising the following steps:
   providing a PVC-based wear layer substantially free of inorganic fillers,
   applying on said PVC-based wear layer a top coating composition comprising polyvinyl alcohol (PVA) and a silane compound comprising at least one amine function, and
   heating said PVC-based wear layer and said top coating composition at a temperature equal or superior to 150° C. to form a wear layer top coating.

2. The process according to claim 1, wherein the silane compound has the following structure:

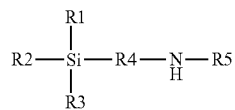

wherein $R_1$, $R_2$, $R_3$ are, independently of one another, an hydroxyl group, a methoxy group, or an ethoxy group, and wherein $R_4$ is $(CH_2)_n$, n being equal to 1, 2 or 3, and wherein $R_5$ is, independently of $R_1$, $R_2$, $R_3$, an Hydrogen, a linear or cyclic alkyl, a phenyl, an amide group, or an amino-ethyl group having the formula —$C_2H_4$—NH—$R_7$, wherein $R_7$ is hydrogen, an alkyl, a phenyl, a benzyl group or a vinyl-benzyl group.

3. The process according to claim 1, wherein the silane compound is selected from the group consisting of 3-aminopropyl-triethoxysilane, 3-aminopropyl-trimethoxysilane, aminoethyl-aminopropyl-silane triol, aminoethyl-aminopropyl-trimethoxysilane, N- (2-Aminoethyl) -3-aminopropyl-trimethoxysilane, N- (2-Aminoethyl) -3-aminopropyl-methyldimethoxysilane, N-2- (Benzylamino) -ethyl-3-aminopropyl-trimethoxysilane, N-2- (Vinylbenzylamino) -ethyl-3-aminopropyl- trimethoxysilane, N-Cyclohexyl-aminomethyl-methyldiethoxysilane, N-Cyclohexyl-aminomethyl-triethoxysilane, N-Cyclohexyl-3-aminopropyl-trimethoxysilane, N-Phenyl-aminomethyl-trimethoxysilane, 3-Ureidopropyl-trimethoxysilane and Vinylbenzyl-aminoethyl-aminopropyl-trimethoxy silane.

4. The process according to claim 1, wherein the silane compound represents in weight 6 to 40% of the PVA weight.

5. The process according to claim 1, wherein the silane compound represents in weight around 35% of the PVA weight.

6. The process according to claim 1, wherein the PVC-based wear layer comprising substantially no inorganic fillers is provided on a liquid form and is pre-gelified at a temperature comprises between 80 and 170° C. before the top coating composition is applied.

7. The process according to claim 1, wherein the step of applying the top coating composition is performed with a PVA-based composition in a liquid form.

8. The process according to claim 1, wherein the top coating composition is applied in a liquid form at between 5 and 100g/m².

9. The process according to claim 1, further comprising the steps of:
   providing a PVC-based support layer,
   applying on said PVC-based support the PVC-based wear layer before applying the top coating composition.

10. The process according to claim 9, further comprising the step of applying a decorative layer on the PVC-based support layer.

11. The process according to claim 9, wherein the PVC-based support layer comprises a glass mat.

12. The process according to claim 9, wherein the PVC-based support layer is a foamable layer.

13. A surface covering obtained by the process according to claim 1.

14. The surface covering according to claim 13, being a floor covering.

* * * * *